(12) United States Patent
Gu

(10) Patent No.: US 7,664,520 B2
(45) Date of Patent: Feb. 16, 2010

(54) LOW CURRENT DIRECT CONVERSION TRANSMITTER ARCHITECTURE

(75) Inventor: Qizheng Gu, San Diego, CA (US)

(73) Assignee: Nokia Corporation, Espoo (FI)

( * ) Notice: Subject to any disclaimer, the term of this patent is extended or adjusted under 35 U.S.C. 154(b) by 569 days.

(21) Appl. No.: 10/876,194

(22) Filed: Jun. 24, 2004

(65) Prior Publication Data
US 2005/0287965 A1    Dec. 29, 2005

(51) Int. Cl.
*H04B 7/00* (2006.01)
*H04B 7/185* (2006.01)

(52) U.S. Cl. ...................................... 455/522; 370/318
(58) Field of Classification Search ................. 455/522; 370/318
See application file for complete search history.

(56) References Cited

U.S. PATENT DOCUMENTS

| | | | | |
|---|---|---|---|---|
| 5,099,203 | A * | 3/1992 | Weaver et al. | 330/10 |
| 6,038,428 | A * | 3/2000 | Mizusawa et al. | 455/69 |
| 7,162,218 | B2 * | 1/2007 | Axness et al. | 455/324 |
| 7,194,242 | B2 * | 3/2007 | Tanaka et al. | 455/127.3 |
| 7,206,557 | B2 * | 4/2007 | Aytur et al. | 455/118 |
| 7,277,689 | B2 * | 10/2007 | Simon | 455/323 |
| 7,477,628 | B2 * | 1/2009 | Hagiwara et al. | 370/335 |
| 2002/0061073 | A1 * | 5/2002 | Huang et al. | |
| 2004/0072547 | A1 * | 4/2004 | Axness et al. | 455/130 |
| 2004/0132424 | A1 * | 7/2004 | Aytur et al. | 455/335 |
| 2004/0137862 | A1 * | 7/2004 | Tanaka et al. | 455/127.3 |
| 2005/0032489 | A1 * | 2/2005 | Boos | 455/127.3 |
| 2005/0036441 | A1 * | 2/2005 | Laroia et al. | 370/203 |
| 2005/0118973 | A1 * | 6/2005 | Khlat | 455/260 |
| 2005/0124377 | A1 * | 6/2005 | Shih et al. | 455/552.1 |
| 2007/0085718 | A1 * | 4/2007 | Axness et al. | 341/143 |
| 2007/0142080 | A1 * | 6/2007 | Tanaka et al. | 455/552.1 |

FOREIGN PATENT DOCUMENTS

| | | |
|---|---|---|
| KR | 1998 0021122 | 6/1998 |
| KR | 1999 0078013 | 10/1999 |
| KR | 2000 0014540 | 7/2000 |
| KR | 2002 0008865 | 2/2002 |
| WO | WO-03/005575 A2 | 1/2003 |
| WO | WO-03056739 A2 | 10/2003 |

OTHER PUBLICATIONS

"CDG System Performance Tests (Optional)", Rev. 3.0 draft, Apr. 9, 2003, 24 pages.
"Recommended Minimum Performance Standards for cdma2000 Spread Mobile Stations", TIA/EIA-98-E, Jan. 17, 2003, 2 pages.

* cited by examiner

*Primary Examiner*—Matthew D Anderson
*Assistant Examiner*—Bobbak Safaipour
(74) *Attorney, Agent, or Firm*—Harrington & Smith, PC

(57) ABSTRACT

Disclosed is a method to operate a RF transmitter, and an RF transmitter constructed to operate in accordance with the method. The method includes determining a transmitter output power and varying a level of a signal at a transmitter phase modulator according to the transmitter output power so as to increase the level of the signal as the transmitter output power increases and to decrease the level of the signal as the transmitter output power decreases. In the preferred embodiment the method further includes adjusting the current consumption of a plurality of components of an RF transmitter chain in accordance with at least one of the level of the signal and the gain of the stage.

28 Claims, 5 Drawing Sheets

LOW CURRENT DIRECT CONVERSION TRANSMITTER ARCHITECTURE

TECHNICAL FIELD

This invention relates generally to radio frequency (RF) transmitters and, more specifically, relates to direct conversion RF transmitters (DCT) such as those used in a mobile station, such as a cellular telephone or other type of wireless communications device.

BACKGROUND

DCT designers typically are concerned with improving the efficiency of a power amplifier (PA) at its maximum output power level, as this efficiency improvement is important in order to reduce the current/power consumption at high transmission power. However, a mobile station transmitter typically does not operate at its maximum output condition. For example, according to a CDMA CDG4 statistical profile (see CDMA Development Group, "CDG System Performance Tests (Optional)", Rev. 3.0 draft, Apr. 9, 2003) the most often encountered transmission power for a CDMA mobile station is at the mid to low power level, such as between about +3 and −10 dBm for a CDMA mobile transmitter used for voice communications. In this transmission power region, the transmitter (Tx) chain dominates the power consumption of the overall transmitter. It is apparent that reducing the Tx chain current consumption can efficiently increase talk time of the mobile station by conserving battery power.

In at least some conventional mobile station transmitter designs the level of the base-band (BB) signal coming from a digital to analog converter (DAC) that is applied at the input of the Tx chain is fixed. In addition to this, the BB signal level is quite high, and may exhibit a 2.5 V peak-to-peak voltage swing. This is based on a consideration that as the BB signal level is made higher, the signal-to-noise ratio (SNR) is also higher. However, to handle such a high level input, a quadrature modulator, which forms the properly modulated transmission signal and converts the BB modulation signal to the desired RF transmission signal, and the following variable gain amplifiers (VGAs) and drive amplifier in the Tx chain, are required to consume a significant amount of current in order to maintain sufficient linearity without causing significant distortion. Therefore, the Tx chain typically operates in an inefficient current consumption condition.

In order to reduce the current (power) consumption of the mobile station transmitter, it is known in the art that the PA bias current can be controlled by adjusting a PA reference current or voltage. However, even greater savings in power consumption, and increases in efficiency, are desired.

SUMMARY OF THE PREFERRED EMBODIMENTS

The foregoing and other problems are overcome, and other advantages are realized, in accordance with the presently preferred embodiments of this invention.

An aspect of this invention is a DCT architecture that exhibits, relative to the prior art, a lower current consumption and a higher power efficiency.

In one aspect this invention provides a method to operate a RF transmitter, where the method includes determining a transmitter output power and varying a level of a signal at a transmitter quadrature modulator according to the transmitter output power so as to increase the level of the signal as the transmitter output power increases and to decrease the level of the signal as the transmitter output power decreases. In the preferred embodiment the method further includes adjusting the current consumption of a plurality of, and possibly all, active stages in a transmitter (Tx) chain, such as the quadrature modulator, an RF variable gain amplifier (VGA) and a driver amplifier, in accordance with the level of the signal and/or the gain of the stage.

In another aspect this invention provides an RF transmitter having circuitry for controlling transmitter output power and for varying a level of a signal at a transmitter phase modulator according to the transmitter output power so as to increase the level of the signal as the transmitter output power increases and to decrease the level of the signal as the transmitter output power decreases.

Also disclosed herein as a preferred, although non-limiting, embodiment is a mobile station having a direct conversion RF transceiver that includes a direct conversion transmitter (DCT). The DCT is constructed to have a digital base band section feeding an analog transmitter chain portion that outputs a signal to a power amplifier. The transmitter chain portion contains a quadrature modulator that inputs signals from inphase (I) and quadrature phase (Q) transmitter channels, and that upconverts the signals to a transmission frequency. The DCT further includes circuitry to control transmitter output power and to vary a level of signals at the quadrature modulator according to the transmitter output power so as to increase the level of the signal as the transmitter output power increases and to decrease the level of the signal as the transmitter output power decreases. Also disclosed is circuitry to adjust the current consumption of, preferably, each active stage in the RF transmitter chain in accordance with the level of the signal and/or the gain of that stage.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figures 1, 1A:
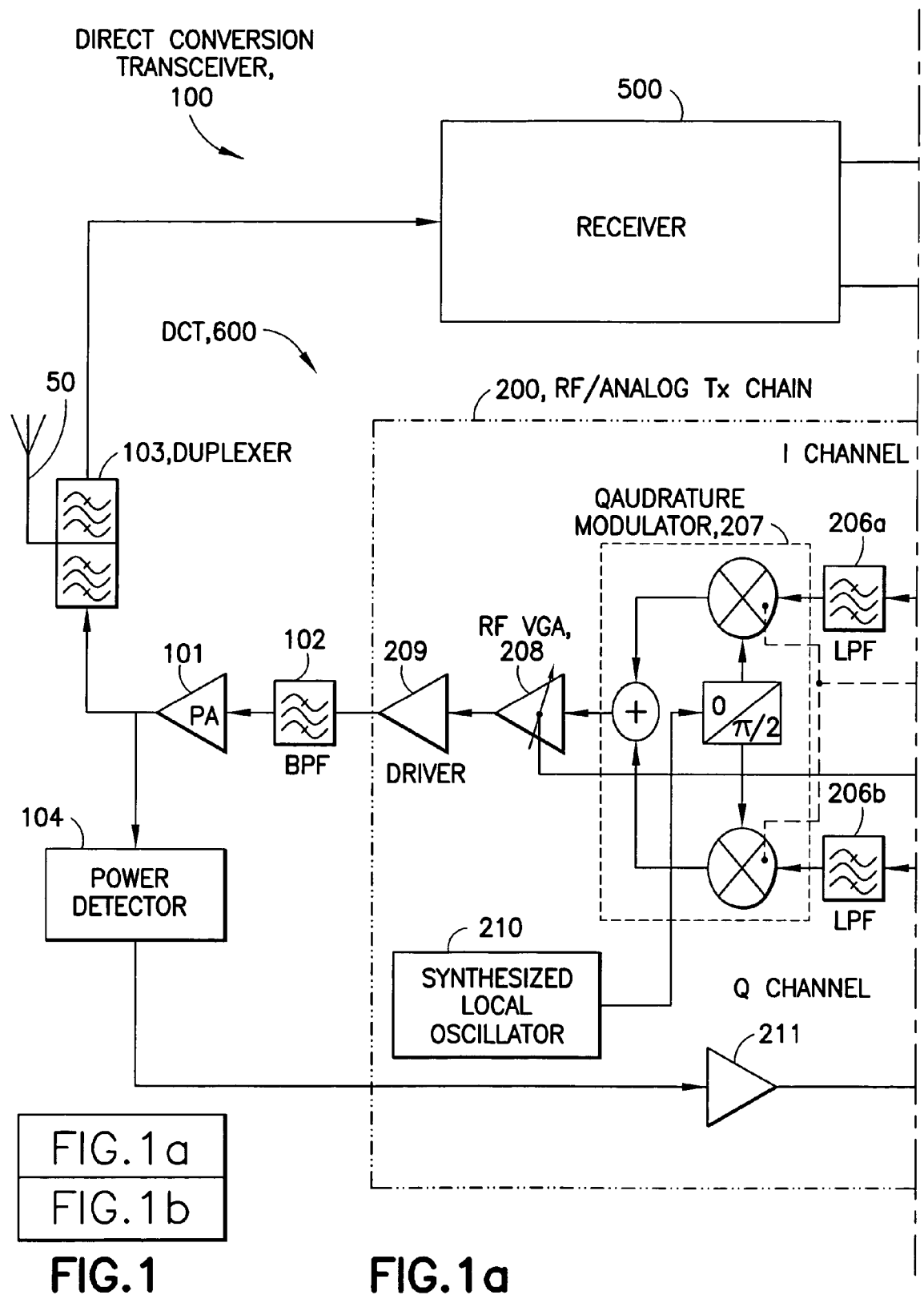
FIG. 1 is a block diagram of a direct-conversion transceiver, and shows in detail a direct conversion transmitter having reduced current consumption in accordance with this invention.
Figure 1B:
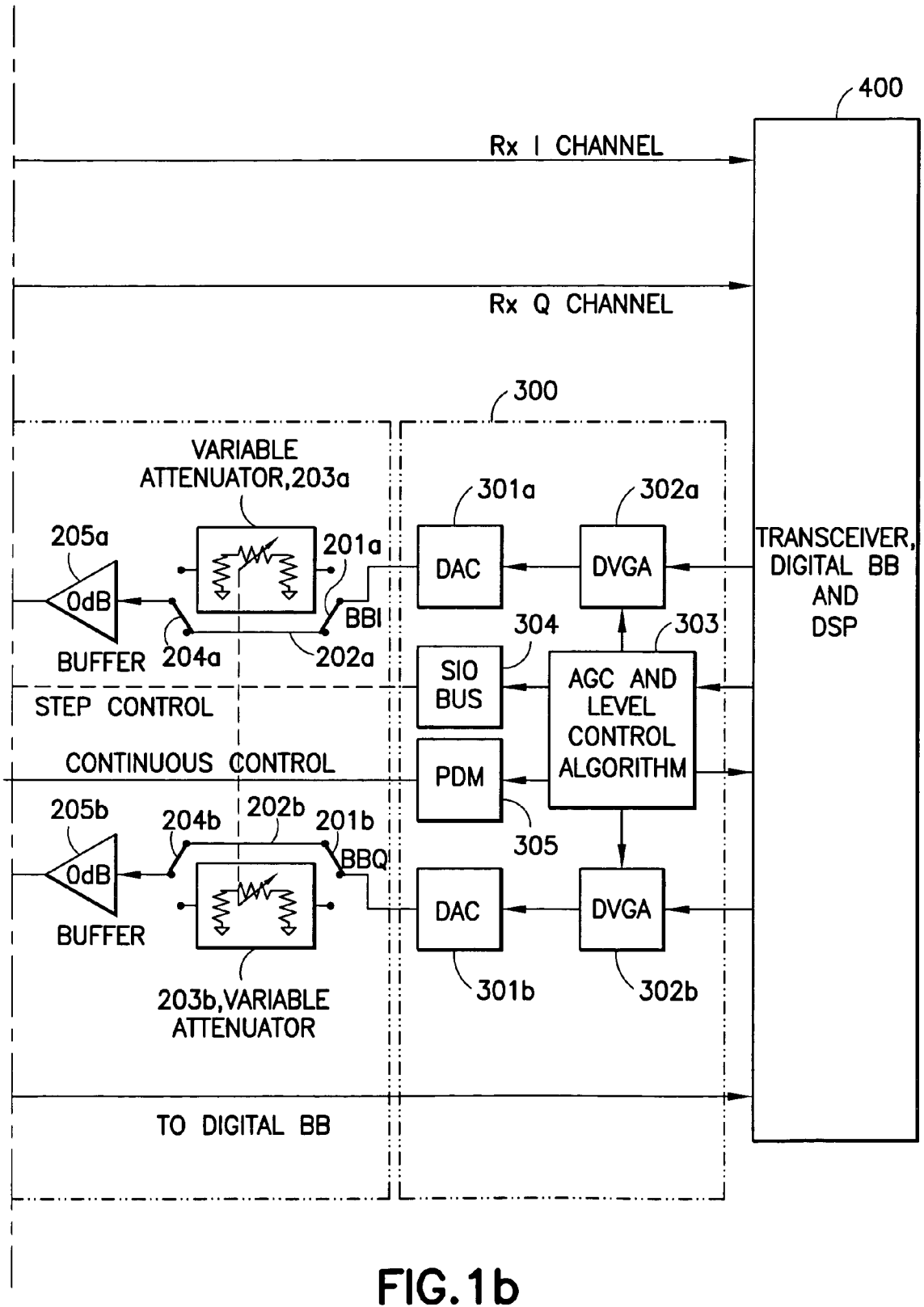

Referring to FIG. 1, a CDMA mobile station includes a direct conversion transceiver 100. The direct conversion transceiver 100 includes a transceiver digital BB and digital signal processor (DSP) block 400, a receiver 500 and, of most interest to this invention, a DCT 600 composed of digital front end blocks 300, an RF/analog Tx chain 200, and related components including a bandpass filter (BPF) 102, a PA 101, and a power detector 104 that feeds a signal back to the transceiver digital BB and DSP block 400 via amplifier 211.

The output of the PA 101, and the input to the receiver 500, are coupled to an antenna 50 via a duplexer 103.

It can be noted that the transceiver 100 is separated into inphase (I) and quadrature (Q) channels, and thus includes the above-mentioned quadrature modulator 207. Other components that can be found in the DCT 600 are a pair of digital variable gain amplifiers (DVGA) 302a, 302b that feed DACs 301a and 301b, respectively. DACs 301a and 301b output an analog BB I signal and a BB Q signal, respectively. Control of the DVGAs 302a and 302b is via an automatic gain control (AGC) and level control algorithm block 303. Step and continuous power control signals can be provided by a serial input/output (SIO) bus 304 and a pulse density modulator (PDM) 305, respectively. The RF/analog Tx chain 200 includes buffer amplifiers 205a and 205b that are shown for convenience as being switchably coupled (201a, 202a, 201b, 202b) either directly to the BBI and BBQ signals, or through variable attenuators 203a and 203b, respectively. As will be explained below, in an embodiment where the BBI and BBQ signals are varied using the DVGAs 302a, 302b and DACs 301a, 301b, then the inputs of the buffer amplifiers 205a, 205b (i.e., the inputs to the TX chain 200) can be directly coupled to the outputs of the DACs 301a, 301b, while in an embodiment where the BBI and BBQ signals are fixed in value, then the inputs of the buffer amplifiers 205a, 205b are preferably coupled to the outputs of the DACs 301a, 301b through the variable attenuators 203a, 203b. In either case, the outputs of the buffers 205a, 205b are applied through low pass filters (LPFs) 206a, 206b to the quadrature modulator 207, where the signals are upconverted using the output of a synthesized local oscillator 210 to the transmission frequency. The combined I and Q upconverted signal is applied as the transmission signal to an RF VGA 208, the gain of which is controlled by the output of the PDM 305. The output of the VGA 208 is applied to a driver 209, and then to the BPF 102 and the PA 101.

The DCT architecture shown in FIG. 1 includes, in accordance with a preferred embodiment of this invention, the DVGAs 302a and 302B, AGC and level control algorithm block 305, and possibly the variable attenuators 203a, 203b. Note that while the variable attenuators 203a, 203b may not be present in an embodiment where the DVGAs 302a, 302b are present (and vice versa), the invention does not preclude the simultaneous presence of all of these components in the DCT 600.

In the CDMA mobile station the transmission power is directly associated with the received signal strength (RSS) of the mobile station receiver 500, and there is a pre-defined and conventional algorithm to determine the transmission power level based on the measured RSS in the receiver. Reference in this regard can be made to TIA/EIA-98-E, "Recommended Minimum Performance Standards for cdma2000 Spread Mobile Stations", Jan. 17, 2003. In general, the transmission power is high when the measured RSS is low, and vice versa, i.e., the transmission power is inversely proportional to the RSS.

From the known transmission power, the AGC and level control algorithm 303 sets the VGA 208 gain as in the conventional CDMA transmitter, however, the level control algorithm also resident in block 303 may also change the gain of the DVGAs 302a and 302b. Thus, the input signal level to the buffers 205a and 205b, and to the quadrature modulator 207, is thereby made to vary with the transmission power. The current consumption of the quadrature modulator 207, the RF VGA 208 and the driver 209 is typically designed in such a manner that it varies as a function of the gain and the input signal level of these components. The VGA 208 gain is typically continuously controlled by the AGC algorithm 303 via the PDM 305, the bias current (or current consumption) of the VGA 208 and the driver 209) is automatically adjusted based on the VGA 208 gain, and the driver 209 bias current is also automatically adjusted using its input excitation level, as the driver 209 is preferably operated in a self-bias mode of operation. The bias current (or current consumption) of the quadrature modulator 207a, 207b is accordingly adjusted based on the I and Q BB signal level, or the DVGA 302a, 302b gain, which is provided by the level control algorithm 303 through the SIO bus 304. The adjustment of the I and Q BB signal level, and the corresponding current of the quadrature modulator 207a, 207b, may be made continuously or step-wise (but continuously is generally preferred), depending on operational requirements. In general, adjusting the bias current of an active TX chain stage is equivalent to adjusting the current consumption of that stage.

The linearity of the quadrature modulator 207, VGA 208 and the driver 209 are properly maintained when adjusting their bias current, based on their gain and the input excitation level.

Discussing the operation of the invention now in further detail, when the received signal strength is low, such as below −101 dBm, the mobile station transmits at maximum power. In this case the transmitter chain 200 requires a high level BB I and BB Q signal input, since its overall gain is finite. The AGC and level control algorithm 303 in this case causes the DVGA 302a, 302b to operate with their maximum gain, and the I and Q DAC 301a, 301b outputs provide their maximum voltage swing. The quadrature modulator 207, the VGA 208 and the drive amplifier 209 are designed so as to have a sufficiently high bias current to handle the large signal excursions without significant distortion, i.e., to maintain the output signal from the TX chain 200 with an acceptably low Adjacent Channel Power Ratio (ACPR) of, for example, <−57 dBc), and a high modulation accuracy, such as the error vector magnitude (EVM) or the waveform quality factor ($\rho$). For example, $\rho$ may have a value of >0.99.

When the transmission power decreases the level control algorithm 303 adjusts the gain of the DVGAs 302a, 302b accordingly, and the output BB signal level from the I and Q DACs 301a, 301b) decreases. The bias current of the quadrature modulator 207a, 207b is reduced based on the decreased gain of the DVGA 302a, 302b. The bias current of the VGA 208 and the driver amplifier 209 is automatically adjusted based on the VGA 208 gain and the driver amplifier 209 input signal level. Thus, the overall current consumption of the transmitter chain 200 is decreased proportionally with output transmission power, however the linearity of the transmitter chain 200 is still adequate to achieve the desired ACPR and modulation accuracy ($\rho$) performance.

It is noted that while the current consumption of the conventional CDMA transmitter chain also drops with output transmission power, the use of this invention can save approximately at least 25% of the average current consumption (over the conventional CDMA transmitter chain average current consumption based on the CDG4 statistical profile). This is true because, unlike the conventional CDMA Tx chain, the I and Q BB signal level at the input of the Tx chain 200 in this invention is also varied with the output transmission power, whereas in the conventional Tx chain the I and Q BB signal level remains constant.

Figure 3:
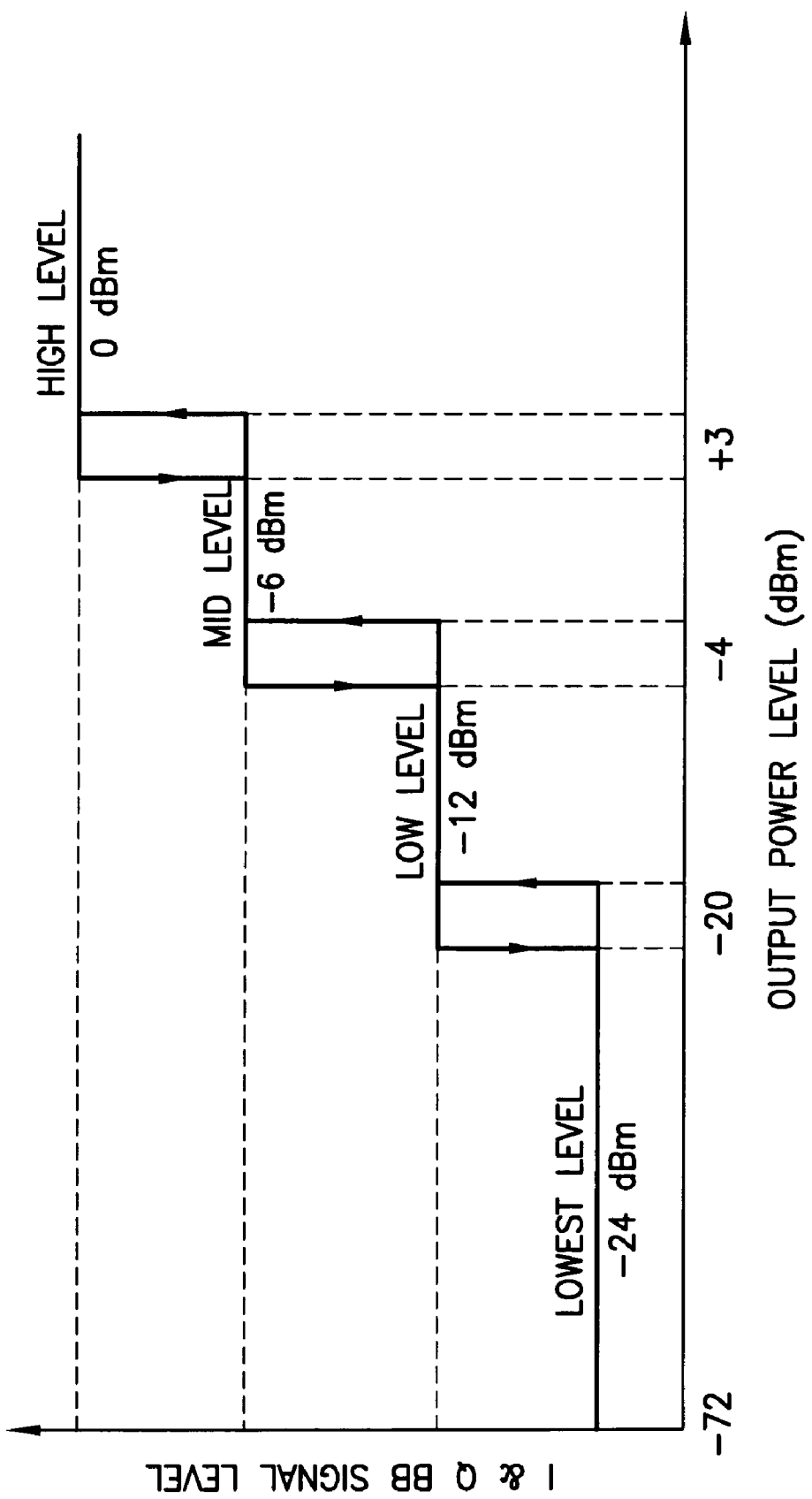
FIG. 3 is an example of an I and Q BB signal level step-variation technique.

The level and bias controls can be implemented in a continuous form if the control function is linearized, or if an approximate closed-form formula is used. Alternatively, the level and bias current changes may be stepped only when the transmission power crosses certain defined levels, with hysteresis, as depicted in FIG. 3. In the step control case a lookup table can be used in the level control algorithm 303. Note that this invention is not limited to the use of the four step levels shown in FIG. 3, and more or less than four levels can be implemented in a particular application. However, and as was noted above, the continuous adjustment is usually preferred in most practical applications. The following example shows that the average current consumption saving of the improved Tx chain 200 can be greater that 25%.

Figure 2:
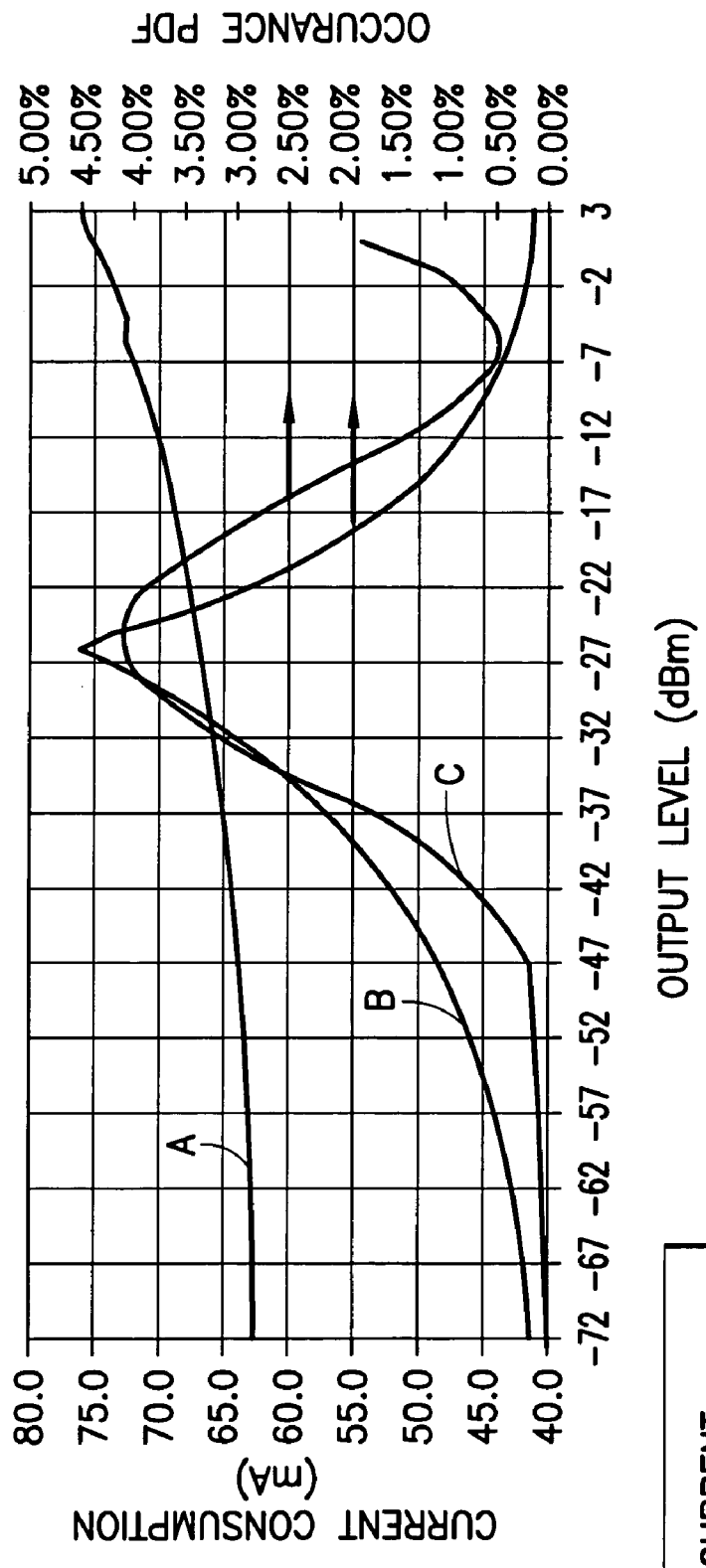
FIG. 2 is shows transmitter chain current consumption vs. its output level for fixed I and Q BB signal input with a maximum level and CDG4 probability distribution functions (PDFs)

For simplicity, it is assumed that in this example the level adjustment of the I and Q BB signals input to the quadrature modulator 207 is stepped. FIG. 2 shows an example corresponding to the case where the I and Q BB signal level at the input of the transmitter chain 200 is fixed, and assumes the maximum voltage swing. The current variation of the transmitter chain over the range between the minimum an the maximum output powers is approximately 14 mA. Also in FIG. 2 is shown power occurrence probability distribution functions (PDFs) of the CDG4 profile for voice communications in urban and suburban areas. In this case the average currents calculated based on the urban and suburban PDFs are 66.6 mA and 67.7 mA, respectively.

Figure 4:
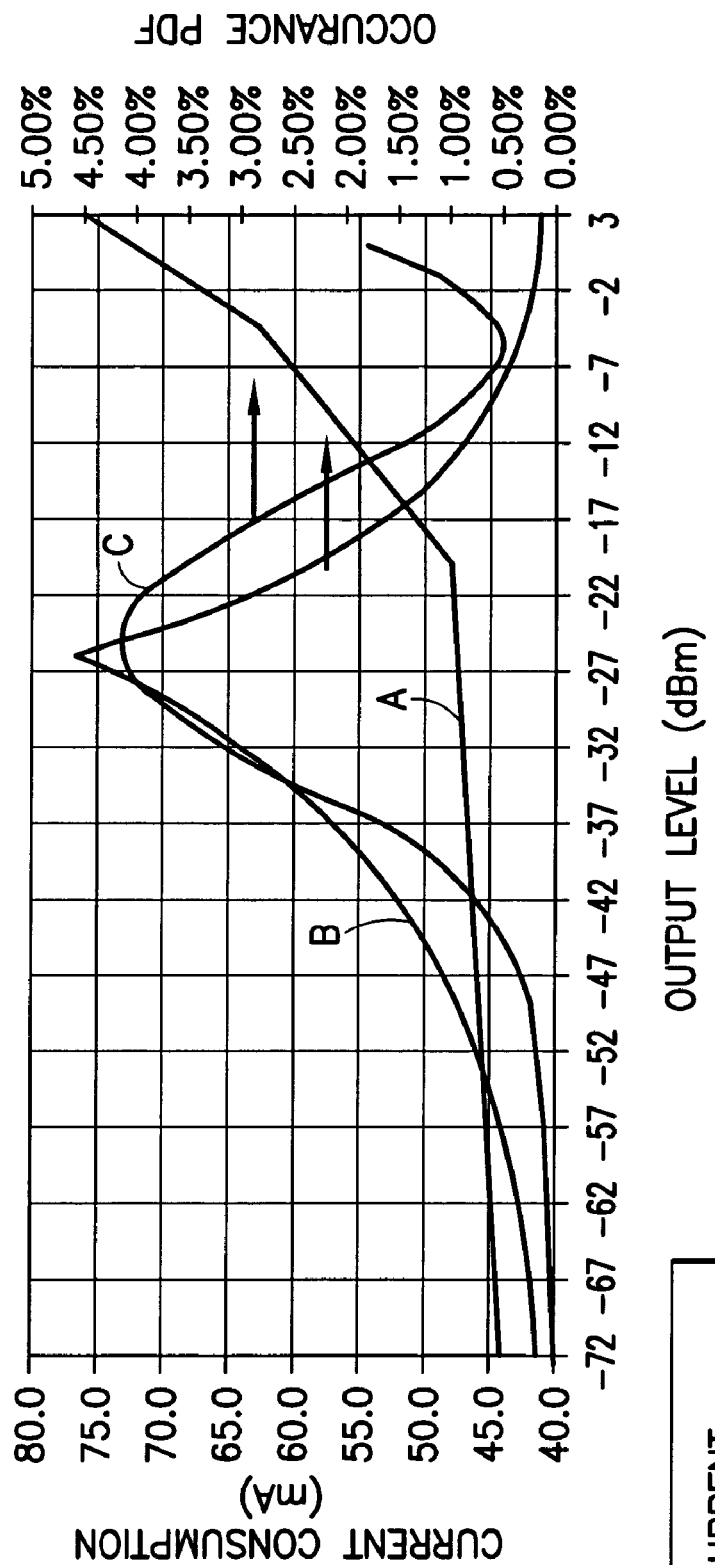
FIG. 4 shows the transmitter chain current consumption vs. output level for a variable I and Q BB signal input with 4 different levels and CDG4 PDFs in accordance with this invention.

Turning now to FIG. 3, there is shown a case where the input I and Q BB signal instead varies step-wise with the output power level, in accordance with this invention, and the corresponding current consumption of the transmitter chain 200 vs. its output power is depicted in FIG. 4. When the I and Q BB signal level is step-varied with the output power, the current variation of the transmitter chain 200 is approximately 32 mA greater than that in the fixed BB signal level case, and the corresponding average current consumptions calculated based on the CDG4 PDFs for the urban and suburban voice communications are 48.4 mA and 50.1 mA, respectively. It can be readily that the improved transmitter chain 200 in accordance with this invention is capable of reducing by more than the 25% the current consumption as compared with the conventional transmitter chain, which uses the fixed I and Q BB signal levels.

An alternative embodiment of this invention is uses the variable attenuators 203a, 203b at the Tx chain 200 instead of the direct connections 202a, 202b. This embodiment is useful in the case where the BB signal level from the DAC 301a, 301b output is fixed. In this case the variable attenuators 202a and 202b function in a manner similar to the DVGAs 302a, 302b to control the level of the BB I and Q signals, and the attenuation level is controlled by the level algorithm unit 303 through the SIO bus 304. For example, the variable attenuators 203a, 203b can be constructed and controlled to provide the multi-step change in the level of the I and Q BB signals as shown on FIG. 3. The output signal level from the variable attenuators 202a, 202b varies with the transmission power level, and the bias current of the stages 207-209 is adjusted accordingly.

This latter embodiment of the invention is particularly useful for upgrading existing Tx architectures in order to use existing digital BB integrated circuits, as one need only add an adjustable attenuator, or an equivalent circuit, to the transmitter chain RF/Analog BB input, and modify the Tx DSP to include a lookup table or equivalent functionality to control, through the SIO or an equivalent control bus, the bias of individual stages in the Tx chain based on the attenuation value or the BB I/Q input level.

As was made apparent above, for a wireless mobile station transmitter the power consumption is critical. The overall power consumption of the transmitter is a function of contributions made by the PA 101 and the Tx chain 200. The Tx chain 200, which is usually implemented within an integrated circuit (IC), dominates the transmitter power consumption when the transmission power is low, such as 5 dBm or lower, for the case of a CDMA mobile station. It has been shown above that by adjusting the output level of the Tx DAC 301a, 301b based on the output power level, as opposed to using a fixed output from the DAC to drive the Tx IC, and by varying the bias of individual stages in the Tx IC, the current consumption of the Tx IC can be reduced, thereby reducing battery drain and increasing the talk time.

This invention provides a direct conversion transmitter architecture in which the DCA output BB signal level, or the Tx chain input level, is programmable based on the transmission power, in conjunction with adjustments to the bias current of individual stages in the Tx chain as appropriate. The BB signal level and the current of the Tx chain 200 are reduced with the transmission power. In this manner the statistical average current consumption is efficiently reduced relative to that of conventional mobile station transmitter architectures, and the talk time is increased significantly.

It can be noted that while the SNR of the BB signal from the output of the DAC 301a, 301b, or at the input of the Tx chain 200, may be degraded, this is acceptable since there is no significant impact on the ACPR and on the modulation accuracy, i.e., on the EVM or the waveform quality factor ($\rho$), of the final transmission signal.

The foregoing description has provided by way of exemplary and non-limiting examples a full and informative description of the best method and apparatus presently contemplated by the inventor for carrying out the invention. However, various modifications and adaptations may become apparent to those skilled in the relevant arts in view of the foregoing description, when read in conjunction with the accompanying drawings and the appended claims. As but some examples, the use of other similar or equivalent circuits and numbers of signal level steps may be attempted by those skilled in the art. In addition, the teachings of this invention can be used in conjunction with the conventional technique of adjusting the bias current of the PA 101 by adjusting the PA 101 reference current or voltage. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method, comprising:
   determining a change in a radio frequency transmitter output power;
   varying, with a digital variable gain amplifier, a level of an input base band signal at an input of a digital to analog converter that outputs a signal to a radio frequency transmitter chain that comprises a phase modulator of the radio frequency transmitter, where the varying is according to the determined change in the radio frequency transmitter output power, comprising increasing the level of the signal as the radio frequency transmitter output power increases and decreasing the level of the signal as the radio frequency transmitter output power decreases; and
   adjusting a bias current of at least the phase modulator according to the varied level of the signal, comprising decreasing the bias current as the level of the signal is decreased and increasing the bias current as the level of the signal is increased.

2. The method as in claim 1, further comprising adjusting the bias current of a plurality of active stages in the radio frequency transmitter chain of the radio frequency transmitter in accordance with the varied level of the signal.

3. The method as in claim 1, performed in a code division, multiple access mobile station.

4. The method as in claim 1, where the radio frequency transmitter chain comprises devices that buffer and filter the signal to the phase modulator.

5. The method as in claim 1, where varying the level of the signal comprises variably attenuating, with a variable attenuator, a signal from the digital to analog converter that outputs a signal to the radio frequency transmitter chain.

6. The method as in claim 1, where the phase modulator comprises a quadrature modulator that upconverts the signal to a transmission frequency.

7. A radio frequency transmitter, comprising:
circuitry configured to determine a change in the radio frequency transmitter output power;
the circuitry configured to vary, with a digital variable gain amplifier, a level of an input baseband signal at an input of a digital to analog converter that outputs a signal to a radio frequency transmitter chain that comprises a quadrature modulator of the radio frequency transmitter, where the varying is according to the determined change in the radio frequency transmitter output power, comprising the circuitry is configured to increase the level of the signal as the transmitter output power increases and to decrease the level of the signal as the transmitter output power decreases; and
the circuitry further configured to adjust a bias current of at least the quadrature modulator according to the varied level of the signal, comprising the circuitry is configured to decrease the bias current as the level of the signal is decreased and increase the bias current as the level of the signal is increased.

8. The radio frequency transmitter as in claim 7, further comprising circuitry to adjust the bias current of a plurality of active stages in the radio frequency transmitter chain of the radio frequency transmitter in accordance with the varied level of the signal.

9. The radio frequency transmitter as in claim 7, further comprising circuitry configured to adjust the bias current of each active stage in the radio frequency transmitter chain in accordance with at least one of the level of the signal and a gain of the stage.

10. The radio frequency transmitter as in claim 7, where the circuitry that digitally varies the level of the signal comprises circuitry to adjust a gain of a digital variable gain amplifier for the input base band signal in accordance with a the varied level of the signal.

11. The radio frequency transmitter as in claim 7, where the the radio frequency transmitter chain comprises devices that buffer and filter the signal to the quadrature modulator.

12. The radio frequency transmitter as in claim 7, where the circuitry configured to vary the level of the signal further comprises a variable attenuator connected to a signal output from the digital to analog converter, where the variably attenuated signal is output to the radio frequency transmitter chain.

13. The radio frequency transmitter as in claim 7, where the quadrature modulator is configured to upconvert the signal to a transmission frequency.

14. The radio frequency transmitter as in claim 7, where the quadrature modulator is configured to input signals from inphase and quadrature transmitter channels.

15. The radio frequency transmitter as in claim 7, where the quadrature modulator is configured to input signals from inphase and quadrature transmitter channels of a code division multiple access mobile station.

16. A mobile station comprising:
a transmitter;
circuitry configured to determine a change in the transmitter output power;
circuitry configured to vary, with a digital variable gain amplifier, a level of an input baseband signal at an input of a digital to analog converter that outputs a signal to a radio frequency transmitter chain that comprises a quadrature modulator of the transmitter, where the level of the signal is varied according to the determined change in the transmitter output power, comprising the circuitry is configured to increase the level of the signal as the transmitter output power increases and to decrease the level of the signal as the transmitter output power decreases; and
circuitry configured to adjust a bias current of at least the quadrature modulator according to the varied level of the signal, comprising the circuitry is configured to decrease the bias current as the level of the signal is decreased and increase the bias current as the level of the signal is increased.

17. The mobile station as in claim 16, where the circuitry that varies the level of the signal comprises circuitry to adjust a gain of variable gain amplifiers of the transmitter in accordance with the determined transmitter output power.

18. The mobile station as in claim 16, where the radio frequency transmitter chain comprises devices that buffer and filter the signal to the quadrature modulator.

19. The mobile station as in claim 16, where the circuitry configured to vary the level of the signal further comprises I channel and Q channel variable attenuators connected to I channel and Q channel signals output from I channel and Q channel digital to analog converters, where the variable attenuators output a variably attenuated signal to the radio frequency transmitter chain.

20. An apparatus, comprising:
a transmitter;
a circuit configured to determine a change in the transmitter output power;
the circuit configured to vary, with a digital variable gain amplifier, a level of an input base band signal at an input of a digital to analog converter that outputs a signal to a radio frequency transmitter chain that comprises a quadrature modulator of the transmitter, where the varying is according to the determined change in the transmitter output power, comprising the circuit is configured to increase the level of the signal as the transmitter output power increases and to decrease the level of the signal as the transmitter output power decreases; and
the circuit further configured to adjust a bias current of at least the quadrature modulator according to the varied level of the signal, comprising the circuit is configured to decrease the bias current as the level of the signal is decreased and increase the bias current as the level of the signal is increased.

21. The apparatus of claim 20, said transmitter further configurable to adjust the bias current of at least one active stage in the radio frequency transmitter chain in accordance with at least one of the level of the signal and a gain of a stage.

22. The apparatus of claim 20, where the radio frequency transmitter chain comprises devices that buffer and filter the signal to the quadrature modulator.

23. The apparatus of claim 20, where varying the level of the signal further comprises variably attenuating a signal from the digital to analog converter, where the variably attenuated signal is output to the radio frequency transmitter chain.

24. The apparatus of claim 20, embodied in at least one integrated circuit.

25. The method of claim 1, where the bias current of at least the radio frequency transmitter phase modulator is adjusted step-wise according to the varied level of the signal.

26. The radio frequency transmitter of claim 7, where the bias current of at least the transmitter quadrature modulator is adjusted step-wise according to the varied level of the signal.

27. The mobile station of claim 16, where the circuitry is further configured to step-wise adjust the bias current of at least the transmitter phase modulator according to the varied level of the signal.

28. The apparatus of claim 20, where the circuit is further configured to step-wise adjust the bias current of the transmitter phase modulator according to the varied level of the signal.

* * * * *